United States Patent [19]

Takahashi et al.

[11] Patent Number: 5,207,312

[45] Date of Patent: May 4, 1993

[54] METHOD OF AND APPARATUS FOR CRAMMING ELECTRONIC COMPONENTS INTO STORAGE MEANS

[75] Inventors: Kuniaki Takahashi; Manabu Uesugi, both of Tokyo, Japan

[73] Assignee: TDK Corporation, Tokyo, Japan

[21] Appl. No.: 903,105

[22] Filed: Jun. 24, 1992

[30] Foreign Application Priority Data

Jun. 24, 1991 [JP] Japan .................. 3-180127

[51] Int. Cl.[5] .............................................. B65G 47/66
[52] U.S. Cl. ..................................... 198/600; 198/609; 198/756; 198/771; 414/415
[58] Field of Search ............... 198/756, 757, 771, 600, 198/609, 391; 414/415

[56] References Cited

U.S. PATENT DOCUMENTS

| | | | |
|---|---|---|---|
| 2,870,938 | 1/1959 | Sirles et al. | 198/756 |
| 3,101,832 | 8/1963 | Wyle et al. | 198/391 |
| 3,194,392 | 7/1965 | Manderbach | 198/771 |
| 3,844,471 | 10/1974 | Mead | 198/771 |
| 4,540,082 | 9/1985 | Maddocks | 198/609 |
| 5,105,930 | 4/1992 | Spatafora et al. | 198/609 |

*Primary Examiner*—Joseph E. Valenza

*Attorney, Agent, or Firm*—Dann, Dorfman, Herrell and Skillman

[57] ABSTRACT

A method of cramming electronic components into a plate-like casing, comprises preparing the casing having a spiral passageway, an opening as a continuation of the passageway to communicate with the exterior of the casing and vents; preparing components; sending the components to vibration-free zone while applying vibration to the components; feeding the foremost one of the components, forwarded to the vibration-free zone, into the passageway through the opening of the casing by the push of subsequent components against the foremost component; causing the foremost components to be moved toward an inside terminal portion of the spiral passageway, while applying vibration to the casing in a manner to cause the vibration, applied to the casing, to extend from an outside terminal portion of the spiral passageway to the inside terminal portion of the spiral passageway and permitting air in the passageway to escape through the vents; and feeding from the vibration-free zone and moving the subsequent components toward the inside terminal portion of the spiral passageway in the same manner as the feeding and moving of the foremost component is performed. Also, an apparatus for cramming electronic components into a plate-like casing.

42 Claims, 8 Drawing Sheets

METHOD OF AND APPARATUS FOR CRAMMING ELECTRONIC COMPONENTS INTO STORAGE MEANS

BACKGROUND OF THE INVENTION

1. Field of the Invention

This invention relates to a method and apparatus for automatically and successively cramming chip-type electronic components into empty storage means.

2. Description of the Prior Art

An example of a storage casing for surface-mounted-type electronic components is disclosed in Japanese Laid-Open Utility Model Publication No. 141386/1990. The storage casing comprises a plate-like body. The plate-like body has a spiral passageway formed in its interior, an opening formed therein as a continuation of the spiral passageway to communicate with the exterior of the plate-like body, air-intakes communicating with the spiral passageway, and air-outtakes communicating with the spiral passageway. Electronic components are adapted to be crammed into the spiral passageway of the storage casing. The casing having electronic components crammed therein is adapted to be used as a supply source to feed the electronic components to an automatic mounting apparatus for mounting electronic components on printed circuit boards. When the casing having electronic components crammed therein is used as an electronic component supply source, air is intermittently fed into the spiral passageway of the casing through the air-intakes, thereby to discharge the electronic components one by one out of the casing through the opening.

The conventional casing is preferred because it takes the form of a plate-like body, is compact, and has the spiral passageway permitting a plurality electronic components to be received therein. Also, it is preferred because when the casing having electronic components crammed therein is used as an electronic component supply source, the electronic components in the casing can be positively discharged one by one from the opening of the casing only by feeding air into the passageway through the air-intakes. However, when electronic components are crammed into the casing, it is required that cramming of the electronic components into the casing is smoothly and efficiently performed without damaging the electronic components.

It is disclosed in Japanese Laid-Open Patent Publication No. 2395/1986 that a casing comprises a casing body having a spiral groove formed therein, and a cover mounted on the casing body. Where electronic components are to be crammed into the casing, the casing is installed in a vibratory machine. The cramming of the electronic components into the casing is carried out by feeding electronic components into the spiral groove through an opening of the casing while applying vibration to the casing in a manner to cause the vibration to spread in one direction by the vibratory machine. Also, when the electronic components in the casing are to be discharged through the opening of the casing, the vibratory machine applies vibration to the casing in a manner to cause the vibration to extend in the opposite direction, to thereby cause the electronic components to be discharged from the opening. The conventional casing further has a joint member provided at opening thereof. When electronic components are to be crammed into the casing, a tube or chute for feeding components is directly connected to the joint member. The cramming of electronic components into the casing is performed by feeding the electronic components through the tube or chute into the spiral groove and causing the electronic components to be moved toward an inside terminal portion of the spiral groove while applying vibration to the casing by the vibratory machine. As feed means for feeding electronic components through the tube or chute, a vibratory bowl feeder or a multi-feeder is generally employed. In an electronic component cramming system having the vibratory bowl feeder (or the multi-feeder), the tube (or chute to which vibration produced in the bowl feeder spreads is directly connected to the opening of the casing, to which casing vibration produced in the vibratory machine is applied, and there is a difference between the mode of vibration spreading from the vibratory bowl feeder to the chute and the mode of vibration applied to the casing by the vibratory machine. Therefore, the vibrations different in the mode will spread to the connecting portion between the chute and the opening of the casing, resulting in that electronic components fed from the bowl feeder will be jammed without going in the spiral groove of the casing. In addition to this, the both vibrations interfere with each other to apply load to electronic components, resulting in the electronic component and/or the outlet of the casing being harmed.

SUMMARY OF THE INVENTION

The present invention has been made with a view to overcoming the foregoing problems of the prior art.

It is therefore an object of the present invention to provide a method and apparatus for automatically and succesively cramming electronic components into storage means which is capable of smoothly and positively cramming electronic components into storage means.

It is another object of this invention to provide a method and apparatus for automatically and successively cramming electronic components into storage means, wherein cramming of electronic components into storage means will be performed without harming the electronic components and/or an opening of the storage means.

In accordance with one aspect of the present invention, there is provided a method of automatically and successively cramming electronic components into storage means, comprising the steps of: preparing storage means comprising a substantially plate-like body, the plate-like body having a substantially spiral passageway formed in its interior, an opening formed therein as a continuation of the spiral passageway to communicate with the exterior of the plate-like body, and vents communicating with the spiral passageway; preparing a plurality of electronic components; lining up the electronic components while applying vibration to the electronic components, and sending the electronic components in one direction while still applying vibration to the electronic components; forwarding in turn the electronic components to a vibration-free zone; applying vibration to the storage means in a manner to cause the vibration, applied to the storage means, to extend from an outside terminal portion of the spiral passageway to an inside terminal portion of the spiral passageway; feeding a foremost electronic component, forwarded in the vibration-free zone, into the spiral passageway of the storage means through the opening of the storage means by the push of subsequent electronic components against the foremost electronic component to cause the electronic components to be moved toward the inside terminal portion of the spiral passageway, while still applying vibration to the storage means and permitting air in the storage means to escape through the vents; and feeding the subsequent electronic components toward the inside terminal portion of the spiral passageway in the same manner as feeding of the foremost electronic component is performed.

According to a further aspect of the present invention, there is provided an apparatus for automatically and successively cramming electronic components into storage means, the storage means comprising a substantially plate-like body, the plate-like body having a substantially spiral passageway formed in its interior, an opening formed therein as a continuation of the spiral passageway to communicate with the exterior of the plate-like body, and vents communicating with the spiral passageway. The cramming apparatus comprises vibratory feed means for feeding electronic components in one direction while applying vibration to the electronic components, the vibratory feed means comprising passageway means for aligning the electronic components when vibration is applied to the electronic components by the feed means; vibratory means for supporting the storage means and applying vibration to the storage means in a manner to permit the vibration, applied to the storage means, to extend from an outside terminal portion of the spiral passageway to an inside terminal portion of the spiral passageway; and vibration-free receiver means for receiving the electronic components from the feed means, the receiver means comprising passageway means for the electronic components and arranged between the feed means and the vibratory means in a manner such that the passageway means thereof is aligned with the passageway means of the feed means and the opening of the storage means supported by the vibratory means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENT

Figure 1:
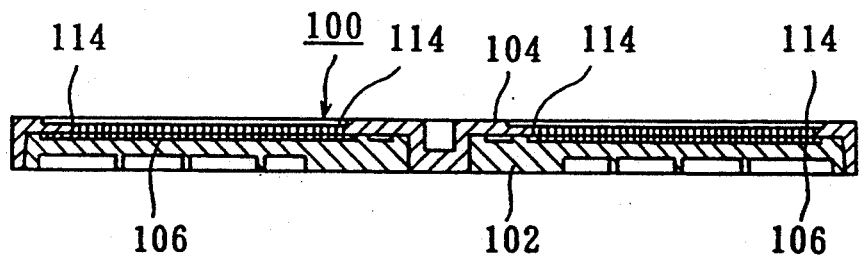
FIG. 1 is a schematic sectional view of storage means.

Before description is made of an apparatus on which a method for automatically cramming electronic components into storage means according to the present invention may be performed, description will be made at first of the storage means. As will be described in detail hereinafter, the storage means having electronic components crammed therein by means of the electronic components cramming apparatus is adapted to be used as a supply source to feed the electronic components to a mounting head of an automatic mounting apparatus when the mounting head is to mount the electronic components on printed circuit boards.

Referring to FIGS. 1 to 4, there is illustrated the storage means 100 for electronic components. The storage means 100 comprises a substantially disk-like casing body 102 and a substantially disk-like cover 104 mounted on the disk-like casing body 102. Each of the disk-like body 102 and disk-like cover 104 is made of plastic material. Preferably, at least the cover 104 is made of transparent plastic material, to thereby permit viewing the interior of the storage means 100.

The disk-like casing body 102 has a substantially spiral groove 106 formed in one surface side thereof, on the spirally grooved surface side of which disk-like casing body 102 the disk-like cover 104 is mounted. The disk-like casing body 102 further has a linear groove 106a linearly extending from a termination of an outermost circle portion 106b of the spiral groove as a continuation of the spiral groove 106, through which linear groove 106a the spiral groove 106 communicates with an opening 108 which is formed at one side of the disk-like casing body 102. As will be described in detail hereinafter, electronic components are adapted to be crammed into the spiral groove 106 through the opening 108 by means of the electronic components cramming apparatus according to the present invention. The opening 108 is used as means to permit electronic components, crammed in the storage means 100, to be discharged out of the storage means 100 therethrough when the storage means 100 having the electronic components crammed therein is used as a supply source to feed the electronic components to a mounting head of an automatic mounting apparatus.

The disk-like casing body 102 is formed with a series of first air-intakes 110 and a series of second air-intakes 112. The first air-intakes 110 are formed at bottom portions of respective circle portions of the spiral groove 106 in a manner to be disposed in two rows along a radial direction from an innermost circle portion 106c of the spiral groove 106 to the outermost circle portion 106b of the spiral groove 106. The second air-intakes 112 are formed in the disk-like casing body 102 in the same manner as the first air-intakes 110 are done. Each of the air-intakes 110 and 112 takes the form of a through-hole which is of a size less than that of an electronic component to be crammed into the spiral groove 106, and communicates with the spiral groove 106. The air-intakes 110 and 112 serve as means to permit air, supplied from an air-supply source in order to facilitate forwarding of electronic components (crammed into the storage means 100) along the spiral groove 106 to the opening 108 as will be discussed in detail hereinafter, to be taken into the spiral groove 106 therethrough when the electronic components in the storage means 100 are discharged from the opening 108 in order to be supplied to the mounting head. Also, the first air-intakes 110 and second air-intakes 112 are formed at the lower half area of the casing body 102 and separated from each other at a predetermined angular space.

The disk-like cover 104 is formed with a series of first air-outtakes 114 and a series of second air-outtakes 116 at the upper half area thereof. The first air-outtakes 114 are disposed in rows along a radial direction from a central portion of the disk-like cover 104. The second air-outtakes 116 are formed in the disk-like cover 104 in the same manner as the first air-outtakes 114 are done, and separated from the first air-outtakes at a predetermined angular space. Each of the air-outtakes 114 and 116 takes the form of a through-hole which is of a size less than that of an electronic component to be crammed in the spiral groove 106, and serves as means to discharge air, supplied from the air-supply source into the spiral groove 106 as described above, out of the storage means 100.

Figure 3:
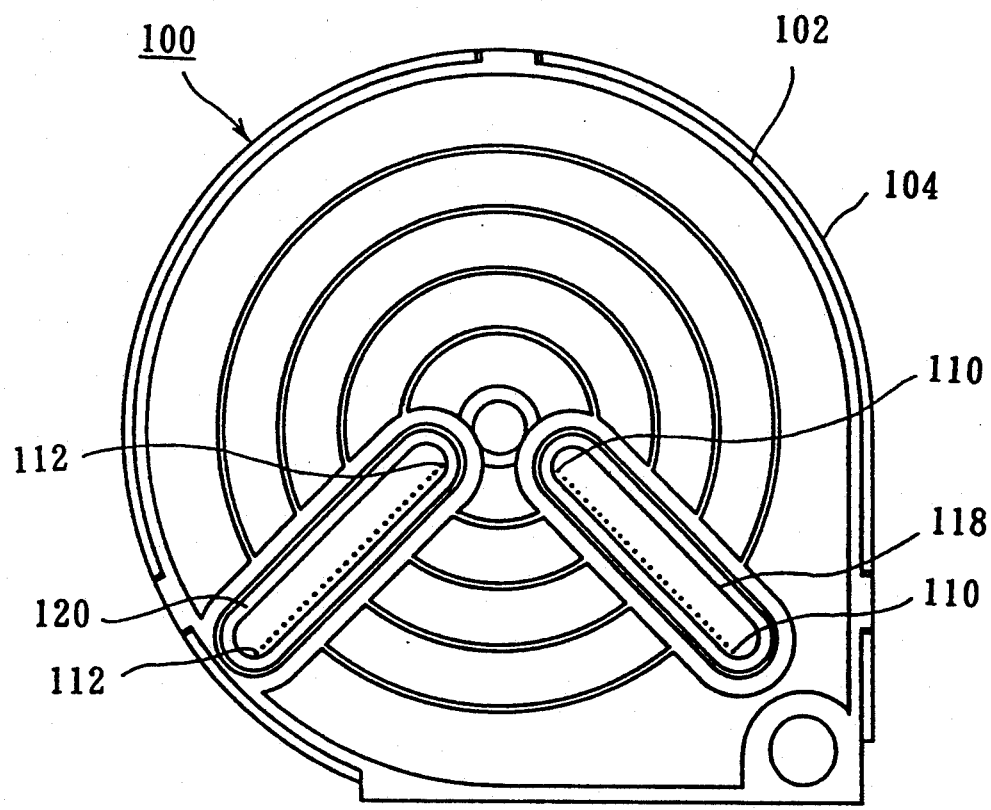
FIG. 3 is a schematic rear elevation of the storage means.

As shown in FIG. 3, the disk-like casing body 102 further has first and second frame portions 118 and 120 formed on the other surface side thereof, each of which frame portions 118 and 120 is of a substantially ring shape. The first frame portion 118 is formed in a manner to surround the first air-intakes 110. Likewise, the second frame portion 120 is formed in a manner to surround the second air-intakes 112. As will be discussed in detail hereinafter, a coupling connected to the air-supply source is adapted to be fitted on each of the frame portions 118 and 120.

Figure 2:
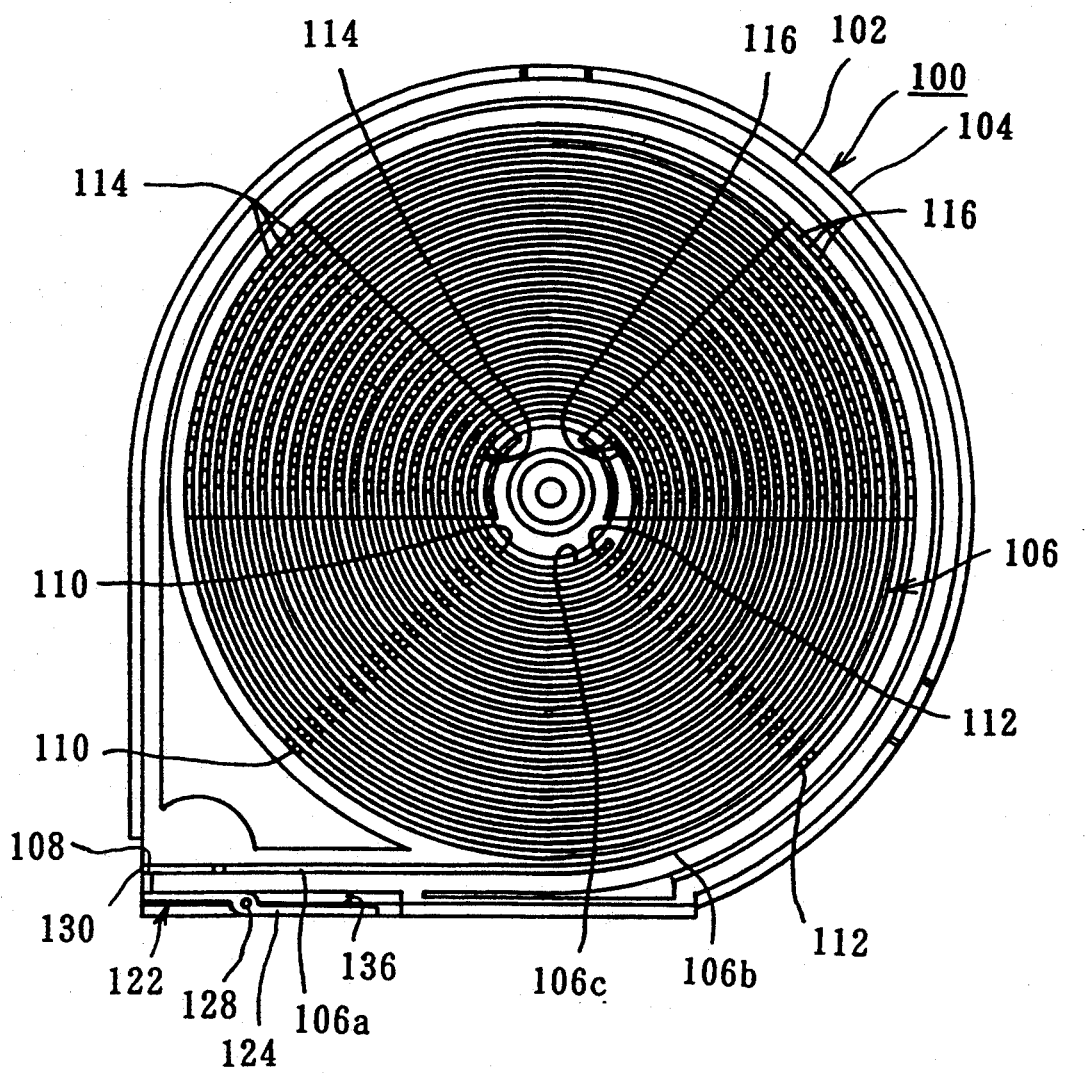
FIG. 2 is a schematic front elevational view of the storage means.
Figure 4:
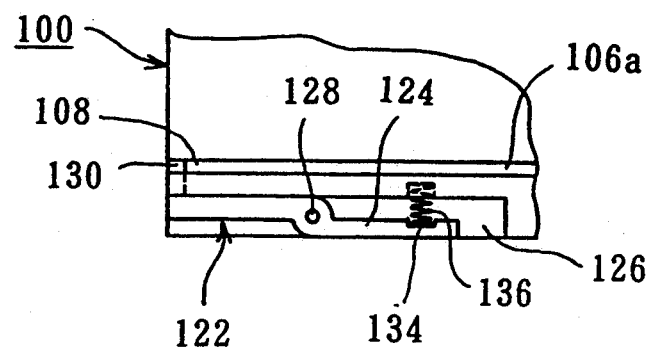
FIG. 4 is a fragmentary front view of the storage means.

As shown in FIGS. 2 and 4, the storage means 100 further includes shutter means 122 for causing the opening 108 to be closed and opened. The shutter means 122 includes an elongated body 124 received in a recess portion 126 formed in a portion of the disk-like casing body 102 near the opening 108, which elongated body 124 of the shutter means 122 is pivotally connected at its substantially middle section to the disk-like casing body 102 through a support pin 128. The elongated body 124 of the shutter means 122 is provided at one end portion thereof with a stopper piece 130. Also, the elongated body 124 of the shutter means 122 is formed at the other end portion thereof with a cutout 134. Arranged between the cutout 134 and an upper wall of the recess 126 is a compressed spring 136, due to an action of which compressed spring 136 the elongated body 124 of the shutter means is always urged in such a manner that the stopper piece 130 thereof is projected in the opening 108 to cause the opening 108 to be closed.

Figure 5:
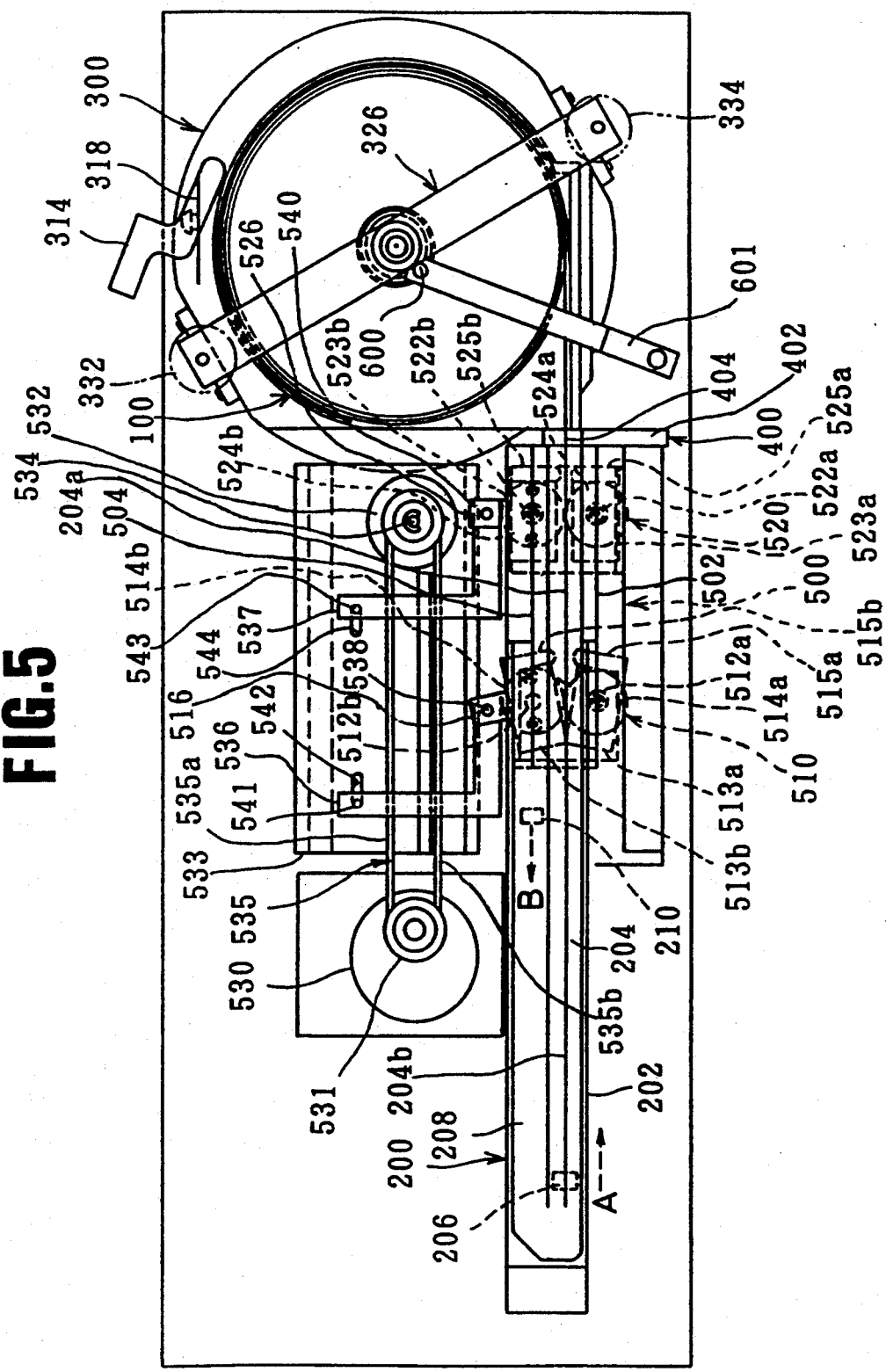
FIG. 5 is a schematic plan view of an apparatus for performing a method of the present invention for cramming electronic components into the storage means.
Figure 6:
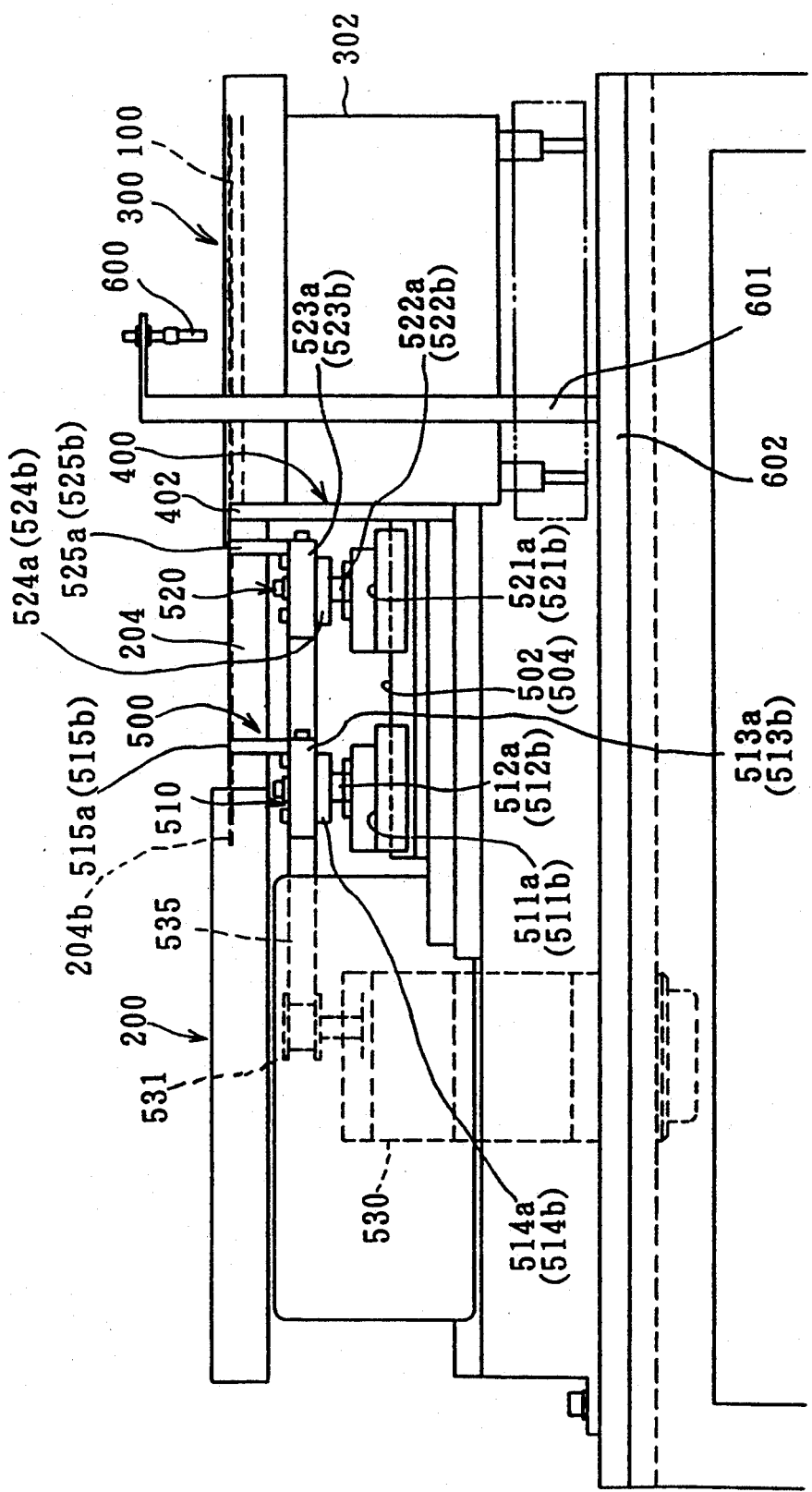
FIG. 6 is a schematic front elevational view of the apparatus.

Referring now to FIGS. 5 and 6, there is illustrated an apparatus for automatically cramming electronic components into the storage means 100. The electronic component cramming apparatus generally includes a parts feeder 200 taking the form of a vibratory feeder designated as "a multi-feeder", a vibratory mechanism 300 for supporting and causing the storage means 100 to be vibrated when electronic components are to be crammed into the storage means 100, electronic component receiver means 400 for receiving the electronic components from the parts feeder 200 arranged between the parts feeder 200 and the vibratory mechanism 300 in a manner not to be subjected to vibrations produced by the parts feeder 200 and the vibratory mechanism 300, and an auxiliary feed mechanism 500 for compulsorily feeding the electronic components to the receiver means 400.

Figure 7:
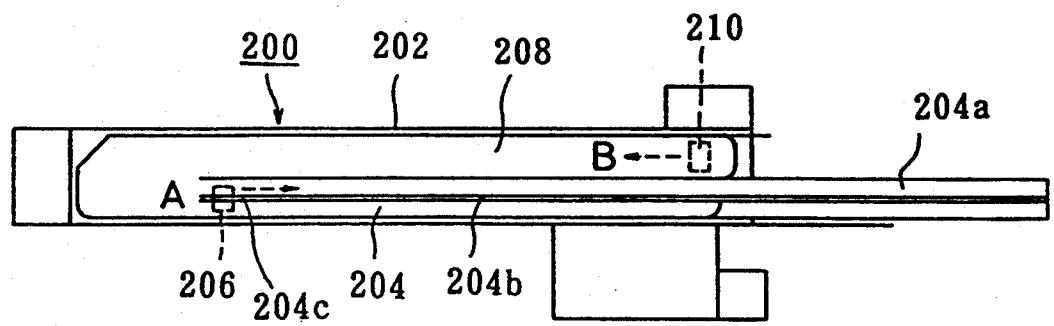
FIG. 7 is a schematic plan view of a parts feeder.
Figure 8:
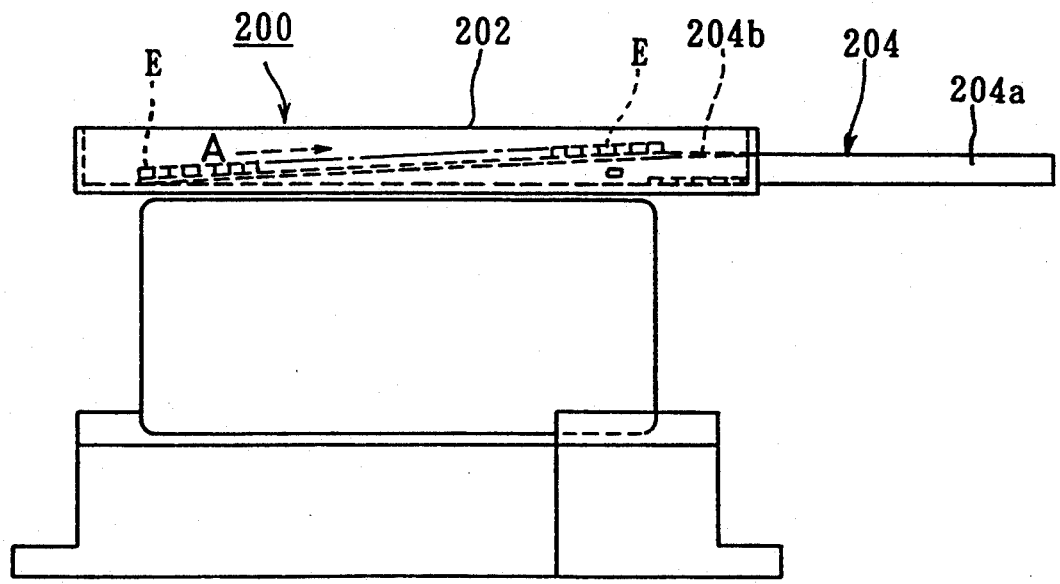
FIG. 8 is a schematic front elevational view of the parts feeder.

Referring to FIGS. 7 and 8, there is illustrated the parts feeder 200. The parts feeder 200 includes a case 202 in which electronic components E are adapted to be randomly put, and guide rail 204 provided in the interior of the case 202 with a terminal end portion 204a thereof being projected outwardly from the case 202. The guide rail 204 has a linear groove 204b formed along a total length thereof. Provided at a portion of the case 202 which positionally corresponds to an initial end portion 204c of the guide rail 204 is a first vibrator 206. The first vibrator 206 serves as means to vibrate the case 202 to cause the vibration to spread along a direction denoted by an arrow A, to thereby facilitate feeding of the electronic components E into the linear groove 204b of the guide rail 204. There is a possibility that any electronic component in the groove 204b will accidentally fall down from the groove 204b of the guide rail 204 to a space 208 of the case 202 while the case 202 is vibrated by the first vibrator 206. In order to forward the electronic component, dropping on the sapce 208, in a direction denoted by an arrow B and feed the electronic component to the end portion 204c of the guide rail 204, a second vibrator 210 for causing vibration to spread along the direction B opposite to the direction A is provided at a portion of the case 202. Incidentally, in order to prevent vibration, produced by the second vibrator 210, from extending to the guide rail 204, a strip of any suitable vibration proof material (not shown) is arranged between the guide rail 204 and the space 208. Also, the guide rail 204 has two spaced elongated through-holes (not shown) formed in each of both side walls of the groove section of the terminal end portion 204a thereof. Each of the elongated through-holes extends along a longitudinal direction of the guide rail 204. As will be discussed in detail hereinafter, clamping claws of the auxiliary feed mechanism 500 are received at tip ends thereof in the elongated through-holes of the guide rail 204.

Figure 9:
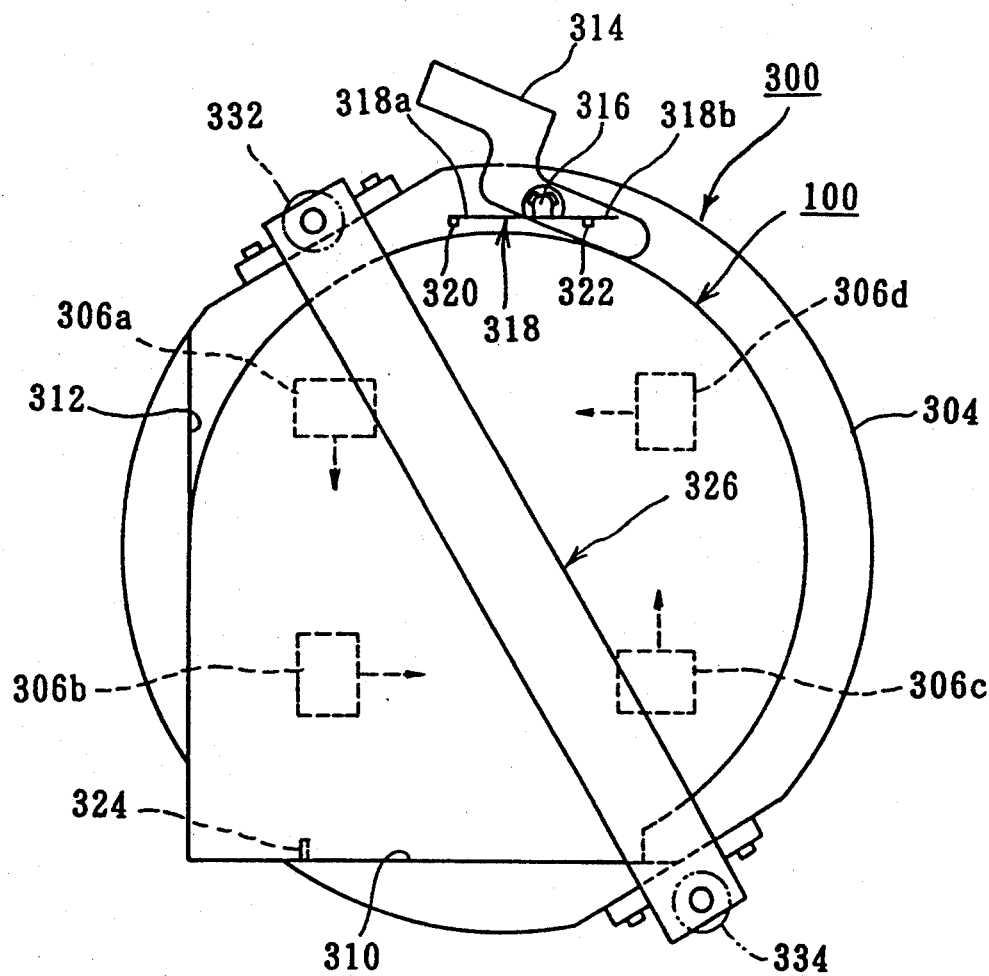
FIG. 9 is a schematic plan view of a vibratory mechanism.
Figure 10:
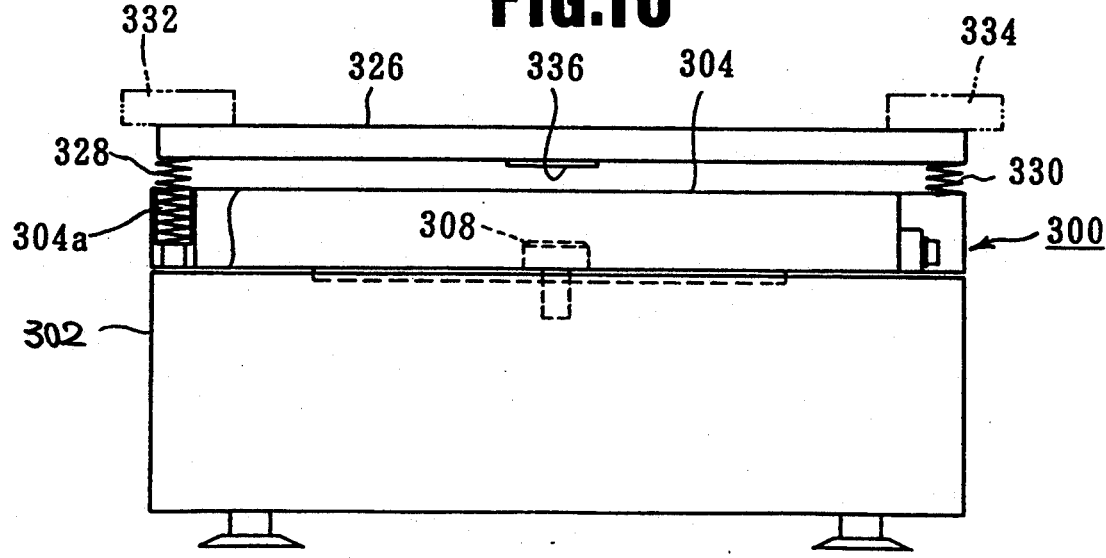
FIG. 10 is a schematic front elevational view of the vibratory mechanism.

Referring to FIGS. 9 and 10, there is illustrated the vibratory mechanism 300. The vibratory mechanism 300 includes a box 302 and a base plate 304 arranged on the box 302, on which base plate 304 the storage means 100 is adapted to be supported. The box 302 has four vibrators 306a, 306b, 306c and 306d arranged therein. The four vibrators 306a, 306b, 306c and 306d are disposed at portions of the box 302 which positionally correspond to four courners of the storage means 100 supported on the base plate 304. The mode of vibration produced by each of the vibrators 306a, 306b, 306c and 306d is set in a manner to permit its vibration to extend to the innermost circle portion of the storage means 100 supported on the base plate 304. The base plate 304 is fastened at a substantially center portion thereof to the box 302 by means of a cap screw 308. If the cap screw 308 is loosely threaded into the box 302, vibration produced by the vibrators 306a, 306b, 306c and 306d will efficently extend through the base plate 304 to the storage means on the base plate 304.

As shown in FIG. 9, the base plate 304 is provided with two spaced edge portions 310 and 312 slightly rising from an upper surface thereof, which two edge portions 310 and 312 extend perpendicularly to each other. Arranged on a portion of the base plate 304 which is opposite to the arranging positions of the edge portions 310 and 312 is a holding arm 314. The holding arm 314 is pivotally connected at a substantially middle portion thereof to the base plate 304 by means of a support pin 316 on which a torsion coil spring 318 is mounted. Both terminations 318a and 318b of the torsion coil spring 318 are respectively engaged with pins 320 and 322 which extend upwardly from the base plate 304. When electronic components are to be crammed into the storage means 100, the storage means 100 is adapted to be placed on the base plate 304 in a manner to be interposed between the holding arm 314 and the edge portions 310 and 312 and in such a manner that a side of the storage means 100, at which the shutter means 122 (see FIGS. 2 and 4) is provided, is opposed to the edge portion 310. When the storage means 100 is so placed on the base plate 304, the storage means 100 is pushed against the edge portions 310 and 312 by means of the holding arm 314. Thus, the storage means 100 is securely positioned on the base plate 304 in cooperation of the holding arm 314 and the edge portions 310 and 312. A pin 324 is provided on a portion of the edge portion 310 which positionally corresponds to a position where the end portion of the elongated shutter body 124 in which the cutout 134 is formed (see FIGS. 2 and 4) is located when the storage means 100 is placed on the base plate 304. The pin 324 projects inwardly from the edge portion 310. When the storage means 100 is positioned on the base plate 304, the pin 324 is adapted to be abutted against the shutter body 124 to cause the shutter body 124 to be rotated about the support pin 128 against the action of the compressed spring 136, to thereby cause the opening 108 of the storage means 100. Thus, electronic components may be crammed into the storage means 100 through the opened opening 108. Arranged above the base plate 304 in a manner to traverse the base plate 304 is an elongated hold-down plate 326 for holding down the storage means 100 supported on the base plate 304. The elongated hold-down plate 326 is provided with compressed coil springs 328 and 330 which are attached onto undersurfaces of both end portions of the elongated hold-down plate 326. Lower end portions of the compressed coil springs 328 and 330 are received in recess portions 304a (only one is shown in FIG. 10) which are formed in the base plate 304. Fastener, e.g., setscrews 332 and 334 penetrate the both end portions of the elongated hold-down plate 326 and are respectively inserted at lower portions thereof in the compressed coil springs 328 and 330 received in the recess portions 304a of the base plate 304. The setscrews 332 and 334 are threaded into bottom portions of the recess portions 304a of the base plate 304. The elongated hold-down plate 326 has a substantially circular projection 336 provided on the approximately middle portion of the undersurface of its longitudinal direction. When the setscrews 332 and 334 are fully threaded into the bottom portions of the recess portions 304a against actions of the compressed coil springs 328 and 330 thereby lowering the hold-down plate 326, the circular projection 336 of the hold-down plate 326 is abutted against a central portion of the storage means 100 placed on the base plate 304 to hold down the central portion of the storage means 100. When the storage means 100 is held down at its central portion by means of the circular projection 336 of the hold-down plate 326, vibrations produced by the vibrators 306a, 306b, 306c and 306d will collectively extend to the central portion of the storage means 100. Therefore, the case where the storage means 100 is held down at the central portion thereof makes it possible to cause the vibrations to efficiently extend to the storage means 100 when compared to a case where the storage means 100 is held down throughout its entire body.

Figure 11:
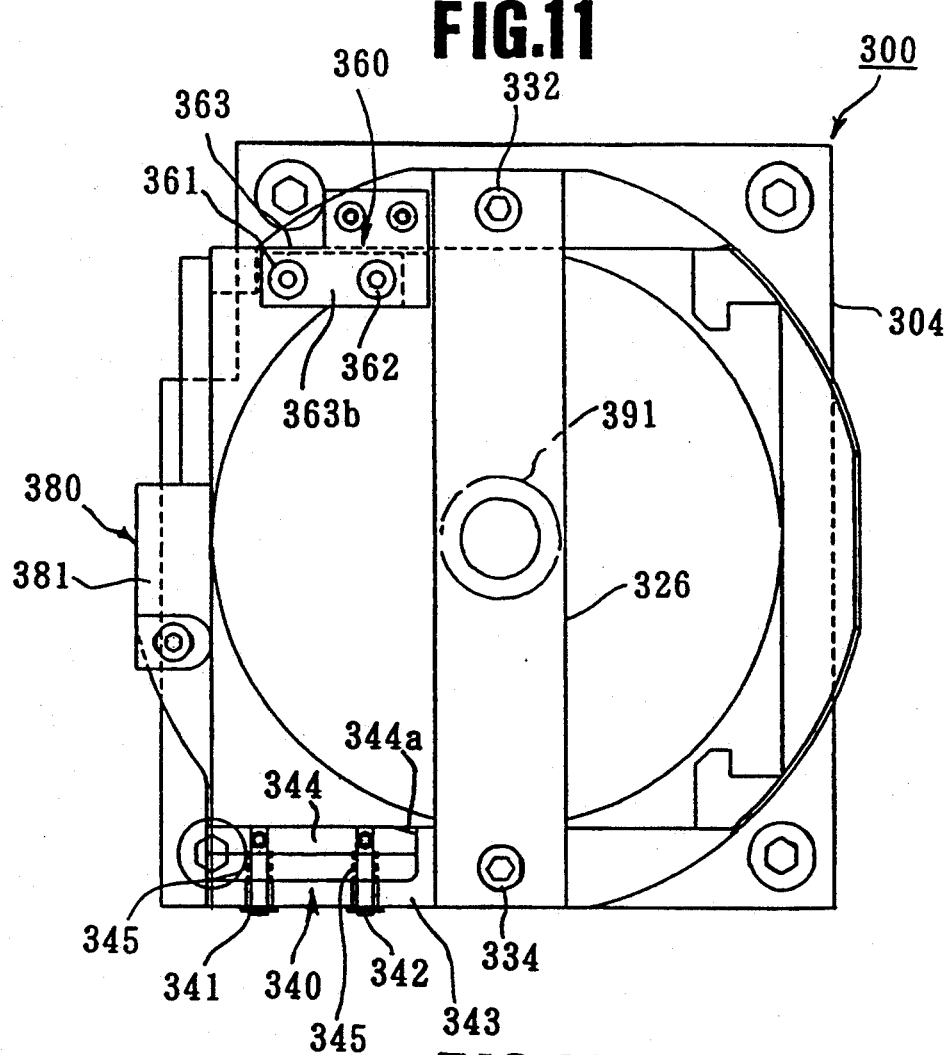
FIG. 11 is a schematic plan view of a modification of the vibratory mechanism shown in FIGS. 9 and 10.
Figure 12:
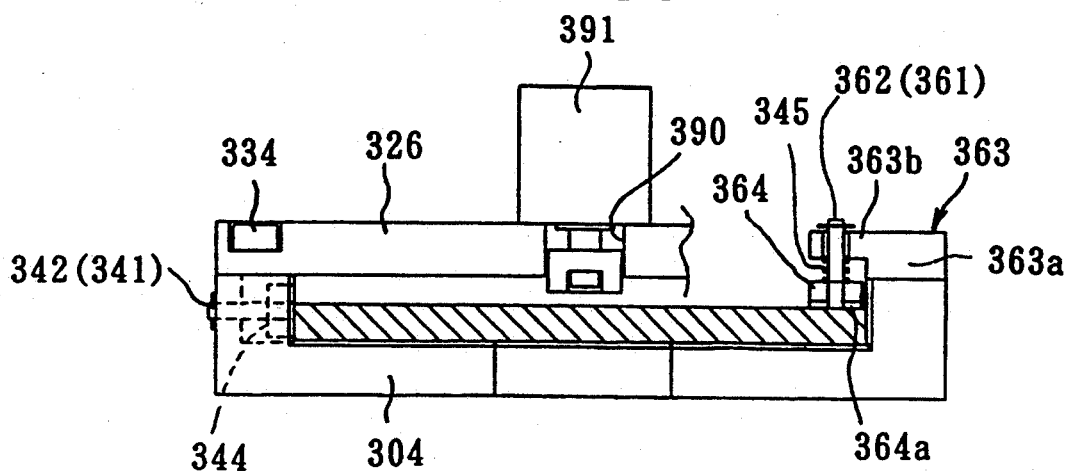
FIG. 12 is a schematic side view of the modification.

Referring to FIGS. 11 and 12, a modification of the vibratory mechanism 300 shown in FIGS. 9 and 10 is substantially similar to that of FIGS. 9 and 10 except that a different positioning mechanism for positioning the storage means 100 on the base plate 304 is employed. In the modification of FIGS. 11 and 12, parts which are similar to those shown in FIGS. 9 and 10 are designated with like reference numerals and the description of them will not be repeated.

The base plate 304 are provided with first, second and third holding means 340, 360 and 380 for holding the storage means 100. These holding means 340, 360 and 380 are located on the left side of the sheet of FIG. 11. The first and second holding means 340 and 360 are opposite to each other. The third holding means 380 are arranged between the first and second holding means 340 and 360. The first holding means 340 includes a pair of pusher pins 341 and 342. The pusher pins 341 and 342 horizontally penetrate a rising plate 343 rising from the base plate 304 and connected at tip ends thereof to a movable plate 344. Each of the pusher pins 341 and 342 has a coil spring 345 fitted thereon, which coil spring 345 is located between the movable plate 344 and the rising plate 343, to thereby push the movable plate 344 away from the rising plate 343. The movable plate 344 is provided with a tepered end 344a. The second holding means 360 includes a pair of pusher pins 361 and 362, and a plate 363 comprising a vertical portion 363a rising from the surface of the base plate 304 and a horizontal portion 363b extending horizontally from an upper end of the vertical portion 363a. The pusher pins 361 and 362 penetrate vertially the horizontal portion 363b of plate 363 and connected at its lower ends thereof to a movable plate 364. Each of the pusher pins 361 and 362 has a coil spring 365 fitted thereon, which coil spring 365 is located between the movable plate 364 the horizontal portion 363b of the plate 363, to thereby push the movable plate 364 downwardly. The movable plate 364 is provided with a tapered end 364a. The thrid holding means 380 comprises an elongated body 381 extending along one side of the base plate 304 of the vibratory mechanism 300. The storage means 100 is adapted to be loaded on the base plate 304 from a right direction of the sheet of FIG. 11. When the storage means 100 is loaded on the base plate 304 while being pushed, a portion of the storage means 100 is abutted against the tapered end 344a of the movable plate 344 of the first holding means 340 to cause the movable plate 344 to be moved in a direction access to the rising plate 343 against the action of the coil spring 345. At this time, similarily, a portion of the storage means 100 is abutted against the tapered end 364a of the movable plate 363 of the second holding means 360 to cause the movable plate 364 to be moved upwardly against the action of the coiled spring 365. Also, A portion of the storage means 100 is stopped against the elongated body 381 of the third holding means 380. Thus, the storage means 100 is effectively positioned on the base plate 304 of the vibratory mechanism 300 by cooperation of these holding means 340, 360 and 380. In the modification of FIGS. 11 and 12, the elongated hold-down plate 326 has not such circular projection as the elongated hold-down plate 326 shown in FIGS. 9 and 10 has. In the modification of FIGS. 11 and 12, the elongated hold-down plate 326 has a circular through-hole 390 formed in the approximately middle portion of its longitudinal direction in which through-hole 30 a rod end of a cylinder 391 located above the base plate 304 of the vibratory mechanism 300 is adapted to go. The cylinder rod goes through the through-hole 390 to directly hold down the storage means 100, placed on the base plate 304, at the central portion of the storage means 100.

Again referring to FIGS. 5 and 6, detection means 600 is supported by a stanchion 601, which extends upward from a body 602 of the electronic component cramming apparatus, in a manner to be located above the base plate 304. When the storage means 100 is placed on the base plate 304, an inside termination of the spiral groove 106 of the storage means 100 is adapted to be positioned just below the detection means 600. When electronic components are crammed into the storage means 100 and the storage means 100 is filled with electronic components, the foremost one of the electronic components crammed in the storage means 100 arrives at the inside termination of the spiral groove 106 of the storage means 100. At this time, the detection means 600 detects the foremost electronic component arriving at the inside termination of the spiral groove 106 of the storage means 100, whereby completion of cramming work of electronic components into the storage means 100 may be detected. In lieu of, or in addition to the detection means 600, counting means for counting the number of electronic components crammed into the storage means 100 may be employed. When a predetermined number of electronic components are crammed into the storage means 100 and the number of the electronic components are counted by the counting means, completion of cramming work of electronic components into the storage means 100 is detected.

The electronic component receiver means 400 comprises a receiving base 402. The receiving base 402 has a passageway 404 taking the form of a linear groove, which passageway 404 has a length enough to receive a few electronic components from the parts feeders 200. The receiving base 402 is arranged in such a manner that an initial end of the passageway 404 is aligned with the linear groove 204b of the guide rail 204 of the parts feeder 200 and a terminal end of the passageway 404 is aligned with the opening 108 of the storage means 100 supported on the base plate 304. The receiving base 402 is in close proximity to the guide rail 204 of the parts feeder 200 and the storage means 100 supported on the base plate 304 but does not come contact with them, whereby the receiving base 402 is not subjected to vibrations produced in the parts feeder 200 and the vibratory mechanism 300. Thus, in the electronic component cramming apparatus accroding to the present invention, the electronic component receiver means 400 constitutes a vibration-free zone.

The auxiliary feed mechanism 500 includes a pair of spaced guide rails 502 and 504 which are located at positions under the both sides of the terminal end portion 204a of the guide rail 204 and mounted on the body 602 of the electronic component cramming apparatus. The guide rails 502 and 504 are arranged in parallel with the guide rail 204 and spaced apart from each other at an interval corresponding to a width of the guide rail 204 of the parts feeder 200. The auxiliary feed mechanism 500 further includes first and second clamping means 510 and 520 for clamping electronic components in the groove 204b of the guide rail 204 of the parts feeder 200. The first clamping means 510 comprises a pair of slide frames 511a and 511b respectively slidably mounted on the guide rails 502 and 504, a pair of support pins 512a and 512b respectively standing up from the slide frame 511a and 511b, a pair of small-sized base plates 513a and 513b respectively turnably supported on the support pins 512a and 512b, a pair of gears 514a and 514b respectively formed integrally with the small-sized base plates 513a and 513b, and a pair of clamping claws 515a and 515b respectively standing up from the base plates 513a and 513b. The gears 514a and 514b are mated with each other. Each of the clamping claws 515a and 514b respectively standing up from the base plates 513a and 513b is horizontally extended at its tip end toward the guide rail 204 of the parts feeder 200. The second clamping means 520 is constructed in the same manner as the first clamping means 510 is done. More particularly, the second clamping means 520 comprises a pair of slide frames 521a and 521b respectively slidably mounted on the guide rails 502 and 504, a pair of support pins 522a and 522b respectively standing up from the slide frame 521a and 521b, a pair of small-sized base plates 523a and 523b respectively turnably supported on the support pins 522a and 522b, a pair of gears 524a and 524b respectively formed integrally with the small-sized plates 523a and 523b, and a pair of clamping claws 525a and 525b respectively rising up from the base plates 523a and 523b. The gears 524a and 524b are mated with each other. Each of the clamping claws 525a and 525b respectively standing up from the base plates 523a and 523b is horizontally extended at its tip end toward the guide rail 204 of the parts feeder 200.

As briefly described above, the guide rail 204 of the parts feeder 200 has two pairs of elongated through-holes (not shown) formed on the both side walls of the groove 204b thereof. The clamping claws 515a and 515b of the first clamping means 510 are respectively inserted at tip ends thereof in one pair of the elongated through-holes which are formed in the both side walls of the groove 204b of the guide rail 204 of the parts feeder 200 in a manner to be aligned with each other. Likewise, the clamping claws 525a and 525b of the second clamping means 520 are respectively inserted at tip ends thereof in the other pair of the elongated through-holes which are formed in the both side walls of the groove 204b of the guide rail 204 of the parts feeder 200 in a manner to be aligned with each other. Thus, the clamping claws 515a and 515a of the first clamping means 510 are faced at the tip ends thereof to each other, and the clamping claws 525a and 525b of the second clamping means are faced at the tip ends thereof to each other.

Each of the first and second clamping means 510 and 520 constructed as described above is adapted to be forwardly and backwardly movable by a distance corresponding to a length of each of the elongated through-holes of the guide rail 204 while being guided along the guide rail 502 and 504.

The auxiliary feed mechanism further includes actuating means for automatically moving the first and second clamping means 510 and 520 forwardly and backwardly. The actuating means includes a reversible motor 530 mounted on the body 602 of the electronic component cramming apparatus, to a rotating shaft of which reversible motor 530 a first pulley 531 is secured. A second pulley 532 is secured to a plate 533, mounted on the body 602 of the electronic component cramming apparatus, through a pin 534. An endless belt 535 couples the first pulley 531 and the second pulley 532. A first support plate 536 of a substantially L-shape is connected at its portion to one side 535a of the endless belt 535. Likewise, a second support plate 537 of a substantially L-shape is connected at its portion to the other side 535b of the endless belt 535. The base plate 513b of the first clampling means 510 is provided with a projecting plate portion 516. Likewise, the base plate 523b of the second clamping means 520 is provided with a projecting plate portion 526. The projecting plate portion 516 of the first clamping means 510 is pivotally connected to one end portion of the L-shaped support plate 536 by means of a pin 538. Likewise, the projecting plate portion 526 of the second clamping means 520 is pivotally connected to one end portion of the L-shaped support plate 537 by means of a pin 540. Provided at the other end portion of the first L-shaped support plate 536 is a vertical guide pin 541 which is received at its lowe end in an elongated hole 542 formed in the plate 533. Also, the second L-shaped support plate 537 is provided at the other end portion thereof with a vertical guide pin 543 which is received at its lower end in an eleongated hole 543 formed in the plate 531. When the rotating shaft of the reversible motor 530 is rotated in a clockwise direction to cause the endless belt 535 to travel in the same direction, the first clamping means 510 and the second clamping means 520 are moved in the direction of access to each other. Conversely, when the rotating shaft of the reversible motor 530 is rotated in a counterclockwise direction to cause the endless belt 535 to travel in the same direction, the first clamping means 510 and the second clamping means 520 are moved away from each other. When the belt 535 travels in the same direction as electronic components in the linear groove 204b of the guide rail 204 of the parts feeder 200, simultaneously the L-shaped support plate 536 is pulled in the same direction by the travelling of the belt 535 to cause the projecting plate 516 pivotally connected to the L-shaped to be turned about the support pin 538 with an attendant rotation of the gears 514a and 514b mated with each other, whereby the tip ends of the clamping claws 515a and 515b are closed to each other to go into the linear groove 204b of the guide rail 204 of the parts feeder 200 and then hold an electronic component in the groove 204b therebetween. On the other hand, such travelling of the belt 535 cause the L-shaped support plate 537 to be moved in the opposite direction since the L-shaped support plate 537 is connected at its portion to the side 535b of the belt 535 as described above, whereby the projecting plate 516 pivotally connected to the L-shaped support plate 537 is drawn in the same direction while being turned about the pin 540 with an attendant rotation of the gears 524a and 524b, resulting in the clamping claws 525a and 525b of the second clamping means 520 being opened away from each other. The clamping claws 515a and 515b of the first clamping means 510 having the electronic component held therebetween is moved forwardly by further travelling of the belt 535. Thus, the electronic component is compulsorily fed toward the receiver means 400. In a state of the clamping pawls 515a and 515b of the first clamping means 510 holding the electronic component, when the reversible motor 531 is rotated in the opposite direction to cause the belt 535 to travel in the same direction, the projecting plate 516 is pulled by the L-shaped support plate 536 while being turned about the support pin 538 with an attendant rotation of the gears 514a and 514b mated with each other, resulting in the clamping claws 515a and 515b being opened away from each other. Thus, the electronic component is released from the clamping claws 515a and 515b. In FIG. 5, the second clamping means 520 is in a state of compulsorily feeding an electronic component, while the first clamping means 510 is in a state of the clamping claws thereof being opened away from each other.

The auxiliary feed means 500, when any electronic component is accidentally jammed in the groove 204a of the guide rail 204 of the parts feeder 200, may be operated. Also, the auxiliary feed means 500 is operated, immediately before completion of cramming work of electronic components into the storage means 100, in order to compulsorily fed electronic components still remaining in the groove 204b of the guide rail 204. This will make it possible to promptly cram electronic component into the storage means 100 and take substantial time during which a state of any electronic components being absent in the groove 204b of the guide rail 204 will be obtained. Therefore, during the substantial time it is possible to replace storage means, filled with electronic components, with empty storage means.

The operation of the electronic component cramming apparatus constructed as described above will be described hereinafter with reference to the accompanying drawings.

The electronic component cramming apparatus according to the present invention may be connected to a turn out line of electronic components, whereby electronic components manufactured in the production line can be successively fed into the case 202 of the parts feeder 200. When vibrations are produced by the first and second vibrators 206 and 210 of the parts feeder 200, the vibrations extend to the guide rail 204, to thereby feed electronic components E into the linear groove 204b of the guide rail 204. Due to the vibration produced in the parts feeder 200, the electronic components travel in a row in the linear groove 204b of the guide rail 204. Simultaneously with the feeding of the electronic components by the vibration, the vibratory mechanism 300 having storage means 100 supported thereby is operated. Then, the electronic components are successively forwarded into the passageway 404 of the vibration-free base 402. When the foremost one of the electronic components having travelled in the linear groove 204b of the guide rail arrives at a point between a terminal end of the guide rail 204 and an initial end of the passageway 404 of the vibration-free base 402 while being subjected to the vibration produced in the parts feeder 200, the foremost electronic component passes through the point while being still subjected to the vibration. The foremost electronic component, immediately after having passed through the point, may be subjected to vibration which extends to subsequent electronic components. However, when the subsequent electronic components are successively fred into the passageway 404 to cause the foremost electronic component to advance, the foremost electronic component is no longer subjected to any vibration and fed into the storage means 100 through the opening 108 of the storage means 100 while being pushed by the subsequent electronic components.

When the foremost electronic component is to be fed into the spiral groove 106 of the storage means 100, the foremost electronic component arrives at the opening 108 of the storage means 100 without being subjected to any vibration, so that even though the storage means 100 is subjected to vibration produced by the vibratory mechanism 300, the foremost electronic component can be smoothly fed into the spiral groove 106 of the storage means 100 through the opening 108. Subsequent electronic components are fed into the spiral groove in the same manner as described above.

Electronic components having been fed into the spiral groove 106 are moved toward the inside terminal portion of the spiral groove 106 while being subjected to vibration produced by the vibratory mechanism 300. As the electronic components are moved toward the inside terminal portion of the spiral groove 106, air contained in the spiral groove 106 of the storage means 100 is spontaneously discharged out of the storage means 100 through the through-holes 110, 112, 114 and 116, so that the electronic cimponents can be successively and smoothly moved to the inside terminal portion of the spiral groove 106.

After completion of the cramming of electronic components into the storage means 100, the storage means 100 having electronic components crammed therein is removed from the base plate 304 of the vibratory mechanism 300.

As described above, the storage means 100 having electronic components crammed therein is adapted to be used as a supply source to feed the electronic components to a mounting head of an automatic mounting apparatus when the mounting head is to mount the electronic components on printed circuit boards.

Figure 13:
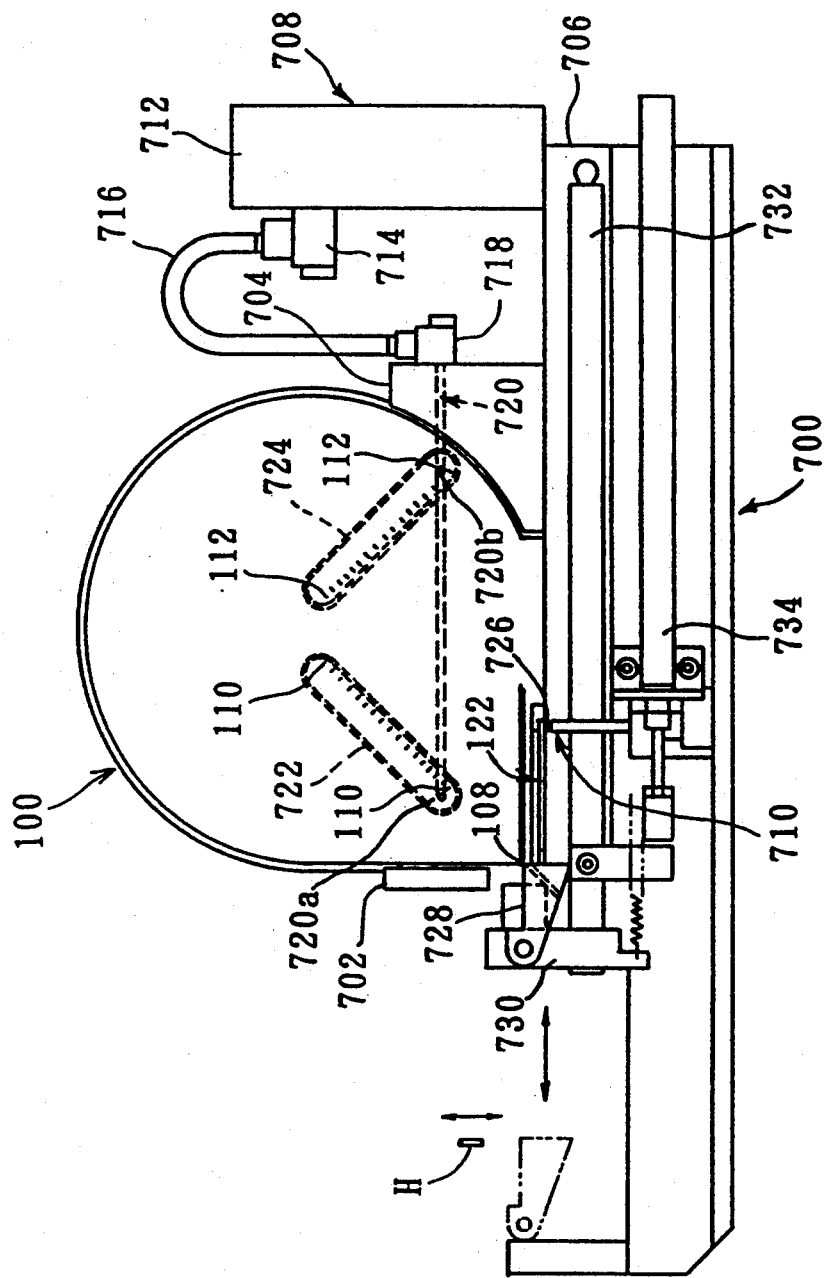
FIG. 13 is a schematic front elevational view of supply means for supplying electronic components one by one to a mounting head using the storage means having electronic components crammed therein by the apparatus of FIGS. 5 and 6.

Referring now to FIG. 13, there is illustrated supply means 700 for supplying electronic components one by one to a mounting head using the storage means 100 having the electronic components crammed therein.

The electronic component supply means 700 includes a pair of stand frames 702 and 704 for holding the storage means 100 from right and left directions, which stand frames 702 and 704 are mounted on a base 706. The storage means 100 is adapted to be installed between the stand frames 702 and 704 in a manner such that the opening 108 thereof is located at a lower position. The supply means 700 further includes air supply means 708 and actuating means 710 for actuating the shutter means 122 (see FIGS. 2 and 4) of the storage means 100. The air supply means 708 comprises an air valve 712 mounted on the base 706, a first joint 714 attahced to the air valve 712, a pipe 716 of a substantially inverted U-shape connected at its one end to the first joint 714, a second joint 718 connected to the other end of the U-shaped pipe 716, and a branched pipe 720 connected to the U-shaped pipe 716 through the second joint 718. The branched pipe 720 has a first pipe portion 720a and a second pipe portion 720b. The couplings 722 and 724, briefly described above, are respectively connected to a tip end of the first pipe portion 720a and a tip end of the second pipe portion 720b. When the storage means 100 is installed in the supply means 700 in the manner as described above, the couplings 722 and 724 are respectively fitted on the first frame portion 118 (see FIG. 3) of the storage means 100 and the second frame portion 120 of the storage means 100. When the electronic components contained in the storage means are to be supplied to an electronic component mounting head, air is adapted to be intermittently fed into the spiral groove 106 of the storage means 100 from the air-intakes 110 and 112 connected through the couplings 722 and 724 to the air supply means 708.

The actuating means 710 for the shutter means 122 of the storage means 100 includes an ejector pin 726 connected to any suitable driving means (not shown). The driving means is adapted to be operated synchronously with the feeding of air into the spiral groove 106 of the storage means 100 by the air supply means 708. When the ejector pin 726 is actuated by the driving means, the ejector pin 726 pushes one end portion of the elongated body 124 of the shutter means (see FIGS. 2 and 4) to cause the elongated body 124 of the shutter means 122 to be rotated about the support pin 128 against the action of the compressed spring 136, to thereby cause the opening 108 of the storage means 100 to be opened. Thus, an electronic component is discharged from the opened outlet 108 by air supplied from the air supply means 708.

The electronic component supply means 700 further includes an electronic component receiving member 728 for receiving an electronic component discharged from the opening 108 of the storage means 100, which electronic component receiving member 728 is normally at a position near the opening 108 of the storage means 100. The receiving member 728 is attached to a bracket 730 which is mounted on a tip end of a slidable bar 732, which slidable bar 732 is slidably supported by the base 706, so that the receiving member 728 is adapted to be horizontally moved with movement of the slidable bar 732 which is performed by actuation of a drive cylinder 734. When the receiving member 728 receives an electronic component discharged from the opening 108 of the storage means 100 and is moved to an electronic component delivering position by the actuation of the drive cylinder 734, a mounting head H, which is at a position above the electronic component delivering position, is moved downward to hold via suction the electronic component on the receiving member 728 and then moved upward to suck up the electronic component. Then, the mounting head H having held the electronic component via suction is moved toward a printed circuit board to place the electronic component on the printed circuit board.

In the electronic component cramming apparatus according to the present invention, even though there is a different in the mode of vibration between vibration produced by the parts feeder and vibration paroduced by the vibratory mechanism, the both vibrations will not extend to electronic components at the same time during the feeding of the electronic components, since the vibration-free receiver means is arranged between the parts feeder and the vibratory mechanism.

Thus, it will be noted that the method and apparatus for cramming electronic components into storage means according to the present invention make it possible to smoothly and efficiently cram electronic components into the storage means.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of automatically and successively cramming electronic components into storage means, comprising the steps of:
   a. preparing storage means comprising a substantially plate-like body, said plate-like body having a substantially spiral passageway formed in its interior, an opening formed therein as a continuation of said spiral passageway to communicate with the exterior of said plate-like body, and a plurality of vents communicating with said spiral passageway;
   b. preparing a plurality of electronic components;
   c. successively sending said electronic components to vibration-free zone while applying vibration to said electronic components to line up said electronic components;
   d. feeding the foremost one of said electronic components, forwarded to said vibration-free zone, into said spiral passageway of said storage means through said opening of said storage means by the push of subsequent electronic components against said foremost electronic component;
   e. causing said foremost electronic component to be moved toward an inside terminal portion of said spiral passageway of said storage means, while applying vibration to said storage means in a manner to cause the vibration, applied to said storage means to extend from an outside terminal portion of said spiral passageway to said inside terminal portion of said spiral passageway and permitting air contained in said spiral passageway of said storage means to escape through the vents;
   f. successively feeding said subsequent electronic components into said spiral passageway of said storage means from said vibration-free zone in the same manner as the feeding of said foremost electronic component from said vibration-free zone into said spiral passageway of said storage means is performed; and
   g. causing said subsequent electronic components to be successively moved toward said inside terminal portion of said spiral passageway in the same manner as the moving of said foremost electronic component toward said inside terminal portion of said spiral passageway is carried out.

2. A method of automatically and successively cramming electronic components into storage means as defined in claim 1, wherein said step (b) comprises the step of munufacturing said electronic components.

3. A method of automatically and successively cramming electronic components into storage means as defined in claim 1, wherein said step (c) comprises the step of compulsorily sending said electronic components to said vibration-free zone.

4. A method of automatically and successively cramming electronic components into storage means as defined in claim 1, wherein said step (c) is performed by a parts feeder, said parts feeder comprising a vibratory case, said vibratory case containing said electronic components therein and having a passageway for facilitating the lining up and guiding of said electronic components provided in the interior of said case in a manner to extend from the interior of said vibratory case to the exterior of said vibratory case; wherein said steps (e) and (g) are performed by vibratory means for supporting said storage means and applying vibration to said storage means in a manner to cause the vibration, applied to said storage means, to extend from said said outside terminal portion of said spiral passageway of said storage means toward said inside terminal portion of said spiral passageway of said storage means; and wherein a vibration-free base for receiving said electronic components from said parts feeder is arranged in said vibrating-free zone, said vibration-free base comprising a passageway for facilitating lining up and guiding of said electronic components and arranged in said vibration-free zone in such a manner that said passageway of said vibration-free base is alinged with said passageway of said parts feeder and said opening of said storage means supported by said vibratory means.

5. A method of automatically and successively cramming electronic components into storage means as defined in claim 1, wherein said plate-like body of said storage means is made of transparent plastic material.

6. A method of automatically and successively cramming electronic components into storage means as defined in claim 1, wherein said storage means having said electronic components crammed therein is adapted to be used as a supply source to feed said electronic components to a mounting head of an automatic mounting apparatus for mounting electronic components on printed circuit boards.

7. A method of automatically and successively cramming electronic components into storage means as defined in claim 1, wherein said plate-like body comprises a base portion and a cover portion; and wherein said spiral passageway is formed in one surface of said base portion and takes the form of a spiral groove, said cover portion mounted on the spirally grooved surface of said base portion.

8. A method of automatically and successively cramming electronic components into storage means as defined in claim 7, wherein said cover portion is formed of transparent plastic material.

9. A method of automatically and successively cramming electronic components into storage means as defined in claim 1, wherein said vents comprises air-intakes and air-outtaks.

10. A method of automatically and successively cramming electronic components into storage means as defined in claim 7, wherein said vents comprises air-intakes and air-outtakes, said air-intakes formed at bottom portions of respective circular portions of said spiral groove in a manner to be disposed in rows along a radial direction from an innermost circle portion of said spiral groove to an outermost circle portion of said spiral groove, and said air-outtakes formed at portions of said cover portion which positionally correspond to said circular portions of said spiral groove of said base portion when said cover portion is mounted on said base portion.

11. A method of automatically and successively cramming electronic components into storage means as defined in claim 4, wherein said vibratory case of said parts feeder is connected to a turn out line of said electronic components.

12. A method of automatically and successively cramming electronic components into storage means as defined in claim 1, wherein said storage means includes shutter means for closing and opening said opening.

13. A method of automatically and successively cramming electronic components into storage means as defined in claim 9, wherein said storage means having said electronic components crammed therein is adapted to be used as a supply source to feed said electronic components to a mounting head of an automatic mounting apparatus for mounting electronic components on printed circuit boards; wherein said air-intakes are adapted to be connected to an air supply source intermittently feeding air when said storage means having said electronic components crammed therein is used as said electronic component supply source; and wherein when said storage means having said electronc components crammed therein is used as said electronic component supply source air from said air supply source is fed into said spiral passageway through said air-intakes, so that said electronic components can be forwarded along said spiral passageway to said opening of said storage means to be discharged by the air fed from said air supply source into said spiral passageway through said air-intakes.

14. A method of automatically and successively cramming electronic components into storage means as defined in claim 13, wherein said storage means comprises shutter means for opening and closing said opening of said storage means, said shutter means causing said opening of said storage means to be opened synchronously with the intermittent feeding of air into said passageway of said storage means, thereby permitting said electronic components to be discharged from said opening of said storage means one by one.

15. A method of automatically and successively cramming electronic components into storage means as defined in claim 10, wherein said storage means having said electronic components crammed therein is adapted to be used as a supply source to feed said electronic components to a mounting head of an automatic mounting apparatus for mounting electronic components on printed circuit boards; wherein said air-intakes are adapted to be connected to an air supply source intermittently feeding air when said storage means having said electronic components crammed therein is used as said electronic component supply source; and wherein when said storage means having said electronic components crammed therein is used as said electronic component supply source air from said air supply source is fed into said spiral passageway through said air-intakes, so that said electronic components can be forwarded along said spiral passageway to said opening of said storage means to be discharged by the air fed from said air supply source into said spiral passageway through said air-intakes.

16. A method of automatically and successively cramming electronic components into storage means as defined in claim 15, wherein said storage means comprises shutter means for opening and closing said opening of said storage means, said shutter means causing said opening of said storage means to be opened synchronously with the intermittent feeding of air into said passageway of said storage means, thereby permitting said electronic components to be discharged from said opening of said storage means one by one.

17. A method of automatically and successively cramming electronic components into storage means as defined in claim 1, further including the step of detecting completion of cramming work of said electronic components into said storage means.

18. An apparatus for automatically and sucessively cramming electronic components into storage means, said storage means comprising a substantially plate-like body, said plate-like body having a substantially spiral passageway formed in its interior, an opening formed therein as a continuation of said spiral passageway to communicate with the exterior of said plate-like body, and vents communicating with said spiral passageway, said cramming apparatus comprising:

vibratory feed means for feeding electronic components in one direction while applying vibration to said electronic components, said vibratory feed means comprising passageway means for lining up and guiding said electronic components when vibration is applied to said electronic components in said feed means;

vibratory means for supporting said storage means and applying vibration to said storage means in a manner to permit the vibration, applied to said storage means, to extend from an outside terminal portion of said spiral passageway to an inside terminal portion of said spiral passageway; and vibration-free receiver means for receiving said electronic components from said feed means, said receiver means comprising passageway means for lining up and guiding said electronic components and arranged between said feed means and said vibratory means in a manner such that said passageway means of said vibration-free receiver means is aligned with said passageway means of said feed means and said opening of said storage means supported by said vibratory means.

19. An apparatus for automatically and successively cramming electronic components into storage means defined in claim 18, further including auxiliary feed means for compulsorily feeding said electronic components in said passageway means of said vibratory feed means to said receiver means.

20. An apparatus for automatically and successively cramming electronic components into storage means as defined in claim 18, said vibratory feed means is connected to a turn out line of said electronic components.

21. An apparatus for automatically and successively cramming electronic components into storage means as defined in claim 18, wherein said vibratory feed means is a parts feeder.

22. An apparatus for automatically and successively cramming electronic components into storage means as defined in claim 21, wherein said parts feeder comprises a vibratory case for receiving said electronic components therein, said passageway means of said parts feeder extending from the interior of said vibratory case to the exterior of said vibratory case.

23. An apparatus for automatically and successively cramming electronic components into storage means as defined in claim 22, wherein said vibratory case is connected to a turn out line of said electronic components.

24. An apparatus for automatically and successively cramming electronic components into storage means as defined in claim 18, wherein said vibratory means comprises a vibratory box; a base plate for supporting said storage means thereon, said base plate arranged on said vibratory box and loosely fastened at a substantially center portion thereof to said vibratory box by means of a cap screw; and an elongated hold-down plate for holding down said storage means on said base plate, said elongated hold-down plate located above said base plate in a manner to traverse said base plate, said elongated hold-down plate having a pair of compressed coil springs provided on undersurfaces of both end portions thereof, said compressed coil springs received at lower end portions thereof in recess portions formed in said base plate, and a pair of setscrews penetrating the both end portions of said elongated hold-down plate to be received in said compressed coil springs to be threaded into bottom portions of said recess portions.

25. An apparatus for automatically and successively cramming electronic components into storage means as defined in claim 24, wherein said elongated hold-down plate has a projection provided on the approximately middle section of the undersurface of its lontitudinal direction.

26. An apparatus for automatically and successively cramming electronic components into storage means as defined in claim 24, wherein said base plate has positioning means for positioning said storage means thereon.

27. An apparatus for automatically and successively cramming electronic components into storage means as defined in claim 25, wherein said base plate has positioning means for positioning said storage means thereon.

28. An apparatus for automatically and successively cramming electronic components into storage means as defined in claim 26, wherein said positioning means comprises a pair of edge portions rising from an upper surface of said base plate and extending perpendicularly to each other, and a holding arm pivotally connected through a support pin to a portion of said base plate, which is opposite to the arranging positions of said edge portions, and urged toward the arranging positions of said edge portions by means of a torsion coil spring, said torsion coil spring fitted on said support pin.

29. An apparatus for automatically and successively cramming electronic components into storage means as defined in claim 27, wherein said positioning means comprises a pair of edge portions rising from an upper surface of said base plate and extending perpendicularly to each other, and a holding arm pivotally connected through a support pin to a portion of said base plate, which is opposite to the arranging positions of said edge portions, and urged toward the arranging positions of said edge portions by means of a torosion coil spring, said torsion coil spring fitted on said support pin.

30. An apparatus for automatically and successively cramming electronic components into storage means as defined in claim 24, further including a cylinder located above said hold-down plate, and wherein said elogated hold-down plate has a through-hole formed in the approximately middle section of its longitudinal direction, through which through-hole a cylinder rod of said cylinder goes when said cylinder is driven, thereby holding down said storage means on said base plate at a central portion of said storage means.

31. An apparatus for automatically and successively cramming electronic components into storage means as defined in claim 30, wherein said base plate comprises postioning means for positioning said storage means on said base plate.

32. An apparatus for automatically and successively cramming electronic components into storage means as defined in claim 31, wherein said positioning means comprises first, second and third holding means for holding said storage means when said storage means are loaded on said base plate, said first and second holding means arranged on said base plate in a manner to be opposite to each other, said third holding means arranged between said first and second holding means, said first holding means comprising a pair of pusher pins, a rising plate rising from an upper surface of said base plate, said pusher pins horizontally penetrating said rising plate, a movable plate connected to tip ends of said pusher pins, said movable plate having a tapered portion, and coil springs fitted on said pusher pins and arranged between said rising plate and said movable plate thereby urging said movable plate away from said rising plate, said second holding means comprising a pair of pusher pins, a plate provided on said base plate and comprising a vertical portion rising from the upper surface of said base plate and horizontal portion extending horizontally from an upper portion of said vertical portion, said pusher pins of said second holding means vertically penetrating said horizontal portion, a movable plate connected to tip ends of said pusher pins of said second holding means, said movable plate of said second holding means having a tapered portion, and coil springs fitted on said pusher pins of said second holding means and arranged between said horizontal portion and said movable plate of said second holding means thereby urging said movable plate of said second holding means away from said horizontal plate, said third holding means comprising an elongated body extending along one side of said base plate.

33. An apparatus for automatically and successively cramming electronic components into storage means as defined in claim 19, wherein said passageway means of said vibratory feed means comprises a guide rail having a groove and two pairs of elongated through-holes formed in both side walls of a terminal portion of said guide rail, each of said through-holes extending along a longitudinal direction of said guide rail, each pair of said through-holes formed in the both side wall of said guide rail being aligned with each other; and wherein said auxiliary feed means comprises a pair of spaced guide rail arranged under said terminal portion of said guide rail of said vibratory feed means and mounted on a body of said electronic component cramming apparatus, first and second clamping means for clamping electronic components in said terminal portion of said guide rail of said vibratory feed means to feed the same electronic components to said receiver means, and actuating means for causing said first and second clamping means to be moved forward and backward, each of said first and second clamping means comprising a pair of slide frames respectively slidably mounted on said spaced guide rails, a pair of support pins respectively standing up from said slide frames, a pair of base plates respectively turnably supported on said support pins, a pair of gears respectively formed integrally with said base plates, and a pair of clamping claws respectively rising up from said base plates, said gears being mated with each other, said clamping claws being respectively received in said aligned elongated through-holes of said guide rail of said vibratory feed means at upper ends thereof, and one of said base plates having a projecting plate portion, said actuating means comprises a reversible motor mounted on said body of said electronic component cramming apparatus, a first pulley secured to a rotating shaft of said reversible motor, a second pulley supported through a pin to said body of said electronic component cramming apparatus, an endless belt coupling said first and second pulleys, a first support plate of a substantially L-shape pivotally connected at one end portion thereof to said projecting plate portion of said base plate of said first clamping means, connected at a substantially middle portion thereof to one side of said endless belt and provided at the other end portion thereof with a pin received in an elongated hole formed in a plate mounted on said body of said electronic component cramming apparatus, and a second support plate of a substantially L-shape pivotally connected at one end portion thereof to said projecting plate portion of said base plate of said second clamping means, connected at a substantially middle portion thereof to the other side of said endless belt and provided at the other end portion thereof with a pin received in an elongated hole formed in said plate mounted on said body of said electronic component cramming apparatus.

34. An apparatus for automatically and successively cramming electronic components into storage means as defined in claim 18, further including detection for detecting completion of cramming work of said electronic components into said storage means.

35. An apparatus for automatically and successively cramming electronic components into storage means as defined in claim 18, wherein said storage means having said electronic components crammed therein is adapted to be used as a supply source to feed said electronic components to a mounting head of an automatic mounting apparatus for mounting electronic components on printed circuit boards.

36. An apparatus for automatically and successively cramming electronic components into storage means as defined in claim 18, wherein said storage means comprises shutter means for opening and causing said opening of said storage means.

37. An apparatus for automatically and successively cramming electronic components into storage means as defined in claim 35, wherein said vents comprises air-intakes and air-outtakes; wherein when said storage means is used as said electronic component supply source said air-intakes are connected to an air supply source intermittently feeding air, so that said electronic components can be moved along said spiral passageway toward said opening of said storage means by air intermittently fed into said spiral passageway through said air-intakes from said air supply source.

38. An apparatus for automatically and successively cramming electronic components into storage means as defined in claim 37, wherein said storage means comprises shutter means for opening and closing said opening, said shutter means causing said opening of said storage means to be opened synchronously with the intermittent feeding of air by said air supply source.

39. An apparatus for automatically and successively cramming electronic components into storage means as defined in claim 18, wherein said plate-like body of said storage means is made of transparent plastic material.

40. An apparatus for automatically and successively cramming electronic components into storage means as defined in claim 18, wherein said plate-like body comprises a base portion and a cover portion; and wherein said spiral passageway is formed in one surface of said base portion and takes the form of a spiral groove, said cover portion mounted on the spirally grooved surface of said base portion.

41. An apparatus for automatically and successively cramming electronic components into storage means as defined in claim 40, wherein said vents comprising air-intakes and air-outtakes, said air-intakes formed at bottom portions of respective circular portions of said spiral groove in a manner to be disposed in rows along a radial direction from an innermost circle portion of said spiral groove, and said air-outtakes formed at portions of said cover portion which positionally correspond to said circular portion of said spiral groove of said base portion when said cover portion is mounted on said base portion.

42. An apparatus for automatically and successively cramming electronic components into storage means as defined in claim 40 wherein said cover portion is made of transparent plastic material.

* * * * *